(12) United States Patent
Murayama

(10) Patent No.: US 9,193,412 B2
(45) Date of Patent: Nov. 24, 2015

(54) STRADDLE-TYPE VEHICLE

(71) Applicant: YAMAHA HATSUDOKI KABUSHIKI KAISHA, Iwata-shi, Shizuoka (JP)

(72) Inventor: Masashi Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/524,144

(22) Filed: Oct. 27, 2014

(65) Prior Publication Data

US 2015/0122571 A1 May 7, 2015

(30) Foreign Application Priority Data

Nov. 1, 2013 (JP) ................................. 2013-228324

(51) Int. Cl.
*B62K 25/28* (2006.01)
*B62K 25/00* (2006.01)
*B60K 13/04* (2006.01)
*B62L 1/00* (2006.01)
*B60T 8/36* (2006.01)

(52) U.S. Cl.
CPC ............... *B62K 25/283* (2013.01); *B60K 13/04* (2013.01); *B62K 25/00* (2013.01); *B62L 1/00* (2013.01); *B60T 8/3685* (2013.01); *F01N 2590/04* (2013.01)

(58) Field of Classification Search
CPC ....... B62K 25/00; B62K 25/283; B62K 25/26
USPC .................... 180/227; 280/284, 288
See application file for complete search history.

(56) References Cited

U.S. PATENT DOCUMENTS

| | | | | |
|---|---|---|---|---|
| 4,523,659 A * | 6/1985 | Yamamoto | ........... | B62K 25/286 180/227 |
| 4,813,697 A * | 3/1989 | Takada | ................. | B62K 25/283 156/91 |
| 6,315,071 B1* | 11/2001 | Gogo | ..................... | B62K 25/04 180/219 |
| 7,226,066 B2 * | 6/2007 | Ichihara | ............... | B62K 25/283 180/227 |
| 7,815,005 B2 * | 10/2010 | Masuda | ............... | B62K 25/283 180/219 |
| 7,821,726 B2 * | 10/2010 | Nawata | .................. | G02B 7/005 359/811 |

(Continued)

FOREIGN PATENT DOCUMENTS

EP 0 417 727 A1 3/1991
EP 2 106 981 A1 10/2009
(Continued)

OTHER PUBLICATIONS

Official Communication issued in corresponding European Patent Application No. 14190828.5, mailed on Feb. 27, 2015.

*Primary Examiner* — Tony Winner
(74) *Attorney, Agent, or Firm* — Keating and Bennett, LLP

(57) ABSTRACT

A straddle-type vehicle includes a rear arm, a seat, a rear suspension located below the seat, and a first silencer at least partially located below the seat and the rear suspension. The rear arm includes the left arm portion, the right arm portion, and a second cross member. The right arm portion is provided with a through-hole extending therethrough in a vehicle width direction and located between the top edge and the bottom edge of the right arm portion. The second cross member includes a coupling portion to which a bottom end portion of the rear suspension is coupled. As seen in a vehicle side view, at least a portion of the coupling portion overlaps the through-hole.

13 Claims, 11 Drawing Sheets

(56) References Cited

U.S. PATENT DOCUMENTS

| | | | |
|---|---|---|---|
| 2008/0073140 A1* | 3/2008 | Seger | B62K 25/283 180/227 |
| 2008/0230293 A1 | 9/2008 | Igarashi et al. | |
| 2009/0166115 A1 | 7/2009 | Mizutani et al. | |

FOREIGN PATENT DOCUMENTS

| | | |
|---|---|---|
| JP | 3-189283 A | 8/1991 |
| JP | 2009-241922 A | 10/2009 |

* cited by examiner

STRADDLE-TYPE VEHICLE

This application claims priority to Japanese Patent Application No. 2013-228324, filed on Nov. 1, 2013, which is incorporated by reference herein in its entirety.

BACKGROUND OF THE INVENTION

1. Field of the Invention

The present invention relates to a straddle-type vehicle.

2. Description of the Related Art

Conventionally, a straddle-type vehicle includes a rear suspension that absorbs impact from the ground in order to improve the riding comfort. Japanese Laid-Open Patent Publication No. 2009-241922 discloses a motorcycle which includes a rear suspension located below a seat, a silencer located below the rear suspension and a rear arm that supports a rear wheel, and in which a bottom end portion of the rear suspension is coupled to the rear arm.

In a straddle-type vehicle, it is desired to lower the position of the seat in order to improve the contact between a rider's foot and the ground. However, in the case where the rear suspension is located below the seat and the silencer is located below the rear suspension, it is not easy to lower the position of the seat.

For the motorcycle disclosed in Japanese Laid-Open Patent Publication No. 2009-241922, it is conceivable to lower the position of the rear suspension in order to lower the position of the seat. Specifically, it is conceivable that the bottom end portion of the rear suspension can be located below the rear arm. However, the silencer is located below the rear suspension. In order to lower the position of the rear suspension while maintaining the minimum ground clearance of the silencer, the capacity of the silencer needs to be decreased.

In the motorcycle disclosed in Japanese Laid-Open Patent Publication No. 2009-241922, the rear suspension is inclined such that the size thereof in a vehicle up-down direction is larger than the size thereof in a vehicle front-rear direction. In order to lower the position of the seat and provide a sufficient capacity of the silencer with certainty, it is conceivable to decrease the size of the rear suspension in an axial direction to decrease the size thereof in the vehicle up-down direction. However, when the size of the rear suspension in the axial direction is decreased, the stroke amount of the rear suspension is decreased. This deteriorates the riding comfort. Alternatively, it is conceivable to locate the rear suspension such that the bottom end portion (rear end portion) thereof is farther rearward with respect to a top end portion (front end portion) thereof in the vehicle front-rear direction without changing the size of the rear suspension in the axial direction. Specifically, it is conceivable to increase the inclination angle of the rear suspension. In this case, since the size of the rear suspension in the vehicle up-down direction is decreased, the position of the seat can be lowered. However, the rear wheel is located rearward of the rear suspension. Therefore, when the rear suspension is inclined at a large inclination angle, the rear suspension and the rear wheel interfere with each other. In order to avoid such interference, the rear wheel needs to be located farther rearward, which may undesirably increase the length of the vehicle in the vehicle front-rear direction.

In the motorcycle disclosed in Japanese Laid-Open Patent Publication No. 2009-241922, the rear arm includes a left arm portion, a right arm portion, and a bridge portion that couples the left arm portion and the right arm portion to each other. The bottom end portion of the rear suspension is attached to a top portion of the bridge portion. Specifically, an attachment portion of the bottom end portion of the rear suspension is located above the rear arm. Therefore, the rear suspension can be attached to the rear arm from a position to the side of the rear arm by use of a tool such as a driver or the like. In order to attach the rear suspension to the rear arm from a position to the side of the rear arm by use of a tool in the state where the position of the bottom end portion of the rear suspension is lowered, the rear suspension needs to be attached at a position below the arm portions. This decreases the capacity of the silencer as described above. For this reason, merely lowering the position of the bottom end portion of the rear suspension is not sufficient, and it is necessary to consider the attachment of the rear suspension to the rear arm.

SUMMARY OF THE INVENTION

Preferred embodiments of the present invention provide a straddle-type vehicle that improves contact between the rider's foot and the ground and allows the rear suspension to be attached the rear arm easily while providing a sufficient level of riding comfort of the rider, a sufficient compactness in the vehicle front-rear direction and a sufficient capacity of the silencer with certainty.

The present inventor investigated a structure in which the coupling portion of the rear suspension and the rear arm is located above the arm portions of the rear arm such that the position of the seat is raised, as compared to a structure in which the coupling portion is located below the arm portions such that the capacity of the silencer is decreased. As a result, the present inventor discovered and conceived that in a structure in which the coupling portion is located at a position overlapping the arm portions as seen in a vehicle side view, the straddle-type vehicle can improve the contact between the rider's foot and the ground while providing a sufficient level of riding comfort of the rider, a sufficient compactness in the vehicle front-rear direction and a sufficient capacity of the silencer with certainty. However, in the structure in which the coupling portion and the arm portions overlap each other as seen in a side view, there may occur another problem that it is difficult to attach the rear suspension to the rear arm. As a result of various studies, the present inventor discovered that this problem is solved by providing a through-hole in the rear arm and locating the coupling portion and the rear arm such that the coupling portion and the through-hole overlap each other as seen in a vehicle side view.

A straddle-type vehicle according to a preferred embodiment of the present invention includes a vehicle body frame; an engine supported by the vehicle body frame; a rear arm at least partially located rearward of the engine; an exhaust pipe coupled to the engine; a seat supported by the vehicle body frame; a rear suspension located below the seat; a silencer coupled to the exhaust pipe and at least partially located below the seat and the rear suspension; and a rear wheel supported by a rear end portion of the rear arm and located rearward of the rear suspension. The rear suspension is configured such that a size thereof in a vehicle up-down direction is larger than a size thereof in a vehicle front-rear direction; the rear arm includes a left arm portion located to the left of the rear wheel, a right arm portion located to the right of the rear wheel, and a cross member coupled to the left arm portion and the right arm portion; at least one of the left arm portion and the right arm portion is provided with a through-hole extending therethrough in a vehicle width direction, the through-hole being provided between a top edge and a bottom edge of the at least one of the left arm portion and the right arm portion provided with the through-hole; the cross member includes a coupling portion to which a bottom end portion of the rear suspension is coupled; and as seen in a vehicle side view, at least a portion of the coupling portion overlaps the through-hole.

In the straddle-type vehicle according to a preferred embodiment of the present invention, at least a portion of the coupling portion of the rear arm is located between the top edge of the arm portion in which the through-hole is located and the bottom edge of this arm portion as seen in a vehicle side view. Therefore, even in the case where the rear suspension is configured such that the size thereof in the vehicle up-down direction is larger than the size thereof in the vehicle front-rear direction, the position of the rear suspension is capable of being lowered without decreasing the size of the rear suspension in an axial direction or decreasing the capacity of the silencer located below the rear suspension. As a result, the position of the seat located above the rear suspension is lowered while a certain level of riding comfort is provided to the rider with certainty. This improves the contact between the rider's foot and the ground. Since the rear suspension is located as described above, the distance between the rear suspension and the rear wheel is shortened. As a result, the straddle-type vehicle is kept compact in the vehicle front-rear direction with certainty. As seen in a vehicle side view, the coupling portion overlaps the through-hole provided in at least one of the left arm portion and the right arm portion. Therefore, the bottom end portion of the rear suspension is attached to the coupling portion easily by inserting a tool such as a driver of the like into the through-hole from a position to the side of the through-hole in the vehicle.

According to a preferred embodiment of the present invention, the straddle-type vehicle further includes an air cleaner located rearward of the engine and the rear suspension is located rearward of the air cleaner.

The air cleaner is located frontward of the rear suspension. Therefore, if the rear suspension is inclined forward at a large angle in order to lower the level of the seat, the rear suspension and the air cleaner interfere with each other. When the capacity of the air cleaner is decreased, the rear suspension is inclined forward at a large angle. However, in this case, the air cleaner does not have a sufficient capacity. In contrast, according to a preferred embodiment of the present invention, the level of the seat is lowered without inclining the rear suspension forward at a large angle. As a result, a space is provided with certainty frontward of the rear suspension. This allows the air cleaner to have a sufficient capacity with certainty while the level of the seat is lowered.

According to a preferred embodiment of the present invention, the straddle-type vehicle further includes a hydraulic unit of an anti-lock brake device. The hydraulic unit is located below the air cleaner; the rear suspension is located rearward of the hydraulic unit; and the rear arm is located below the hydraulic unit.

The hydraulic unit is located frontward of the rear suspension. Therefore, if the rear suspension is inclined forward at a large angle in order to lower the level of the seat, the rear suspension and the hydraulic unit interfere with each other. In contrast, according to a preferred embodiment of the present invention, the level of the seat is capable of being lowered without inclining the rear suspension forward at a large angle. Therefore, the rear suspension and the hydraulic unit are prevented from interfering with each other while the level of the seat is lowered. The space that is below the air cleaner, frontward of the rear suspension and above the rear arm is effectively used to install the hydraulic unit. Therefore, the hydraulic unit is configured in a compact manner.

According to a preferred embodiment of the present invention, the left arm portion includes a left inclining portion inclined obliquely in a rearward and leftward direction; the right arm portion includes a right inclining portion inclined obliquely in a rearward and rightward direction; as seen in a plan view, the coupling portion is located between the left inclining portion and the right inclining portion; and the through-hole is provided in a portion that is longest in the vehicle width direction in the left inclining portion and the right inclining portion.

The through-hole is preferably located in a portion that is longest in the vehicle width direction in the left inclining portion and the right inclining portion. Therefore, the rigidity of the arm portion in which the through-hole is located is sufficiently high with certainty.

According to a preferred embodiment of the present invention, the at least one of the left arm portion and the right arm portion provided with the through-hole includes a second portion that is located frontward of a first portion provided with the through-hole and has a size in the vehicle up-down direction smaller than a size in the vehicle up-down direction of the first portion, and a third portion that is located rearward of the first portion and has a size in the vehicle up-down direction smaller than the size in the vehicle up-down direction of the first portion.

The through-hole is located in a portion of the arm portion, which has a large size in the vehicle up-down direction. Therefore, the rigidity of the arm portion in which the through-hole is provided is sufficiently high with certainty.

According to a preferred embodiment of the present invention, as seen in a vehicle side view, a center of the through-hole is located below a center position in the vehicle up-down direction of the at least one of the left arm portion and the right arm portion provided with the through-hole.

The through-hole is located at a low position. Therefore, the coupling portion overlapping the through-hole as seen in a vehicle side view is located at a low position. Therefore, the position of the rear suspension is lowered, and thus the position of the seat located above the rear suspension is lowered.

According to a preferred embodiment of the present invention, the coupling portion includes a left wall extending in the vehicle up-down direction, a right wall located to the right of the left wall and extending in the vehicle up-down direction, a bottom wall extending between a bottom end of the left wall and a bottom end of the right wall, a left projection portion extending from a top end of the left wall toward the cross member and connected to a top wall of the cross member, and a right projection portion located to the right of the left projection portion, extending from a top end of the right wall toward the cross member and connected to the top wall of the cross member; the left wall and the right wall are respectively provided with holes; and as seen in a vehicle side view, the holes overlap the through-hole.

As can be seen, the left projection portion and the right projection portion of the coupling portion extend toward the cross member and are connected to the top wall of the cross member. Therefore, the coupling portion and the cross member are secured to each other more strongly. As a result, the rigidity at which the rear suspension coupled to the coupling portion is supported is sufficiently high with certainty. By inserting a tool such as a driver or the like into the through-hole from a position to the side of the through-hole, the bottom end portion of the rear suspension is attached to the coupling portion easily by use of a coupling tool such as a bolt or the like.

According to a preferred embodiment of the present invention, the through-hole is provided in the left arm portion or the right arm portion; as seen in a vehicle side view, in the arm portion provided with the through-hole, the bottom edge of the portion in which the through-hole is provided is located above a bottom edge of a portion, of the other arm portion, that faces the through-hole; and at least a portion of the silencer is located below the through-hole.

As can be seen, the bottom edge of the arm portion in which the through-hole is provided is located above the bottom edge of the other arm portion. Therefore, as compared with the case where the level, from the ground, of the bottom edge of the arm portion in which the through-hole is provided, and the level of the bottom edge of the other arm portion from the ground, are equivalent to each other, a portion of the silencer is located at a higher position. As a result, a sufficient bank angle is provided with certainty.

According to a preferred embodiment of the present invention, a pipe preferably extends through the through-hole in the vehicle width direction.

With this structure, the rigidity of the left arm portion and/or the right arm portion in which the through-hole is provided is increased.

According to a preferred embodiment of the present invention, the cross member is inclined with respect to a horizontal direction.

As a result, as compared with the case where the cross member extends in the horizontal direction, the length of the cross member in the vehicle width direction is increased. As a result, the level of freedom at which the coupling portion and the through-hole are located in the vehicle up-down direction and the vehicle width direction is increased.

According to a preferred embodiment of the present invention, as seen in a vehicle side view, the rear arm and a portion of the silencer overlap each other.

As a result, the silencer extends from a position below the rear suspension to a position to the side of the rear arm. Therefore, the capacity of the silencer is increased while the level of the seat is lowered.

According to a preferred embodiment of the present invention, the cross member includes a front wall extending from the left arm portion to the right arm portion, and a rear wall located rearward of the front wall and extending from the left arm portion to the right arm portion; and the coupling portion is provided on the rear wall.

As a result, a space is provided with certainty frontward of the rear suspension. This space is effectively used to, for example, install vehicle components. In order to lower the position of the bottom end portion of the rear suspension, it is conceivable to locate the cross member to a lower position so that the size of the cross member in the vehicle up-down direction is decreased. In this case, the thickness of the cross member is decreased, and thus the rigidity thereof is decreased. In contrast, according to a preferred embodiment of the present invention, the position of the bottom end portion of the rear suspension is lowered while the rigidity of the cross member is kept high with certainty.

According to a preferred embodiment of the present invention, the cross member includes a front wall extending from the left arm portion to the right arm portion, and a rear wall located rearward of the front wall and extending from the left arm portion to the right arm portion; and the coupling portion is provided on the front wall.

As a result, a space is provided with certainty rearward of the rear suspension, and thus the distance between the rear suspension and the rear wheel is shortened. As a result, the motorcycle is kept compact in the vehicle front-rear direction with certainty. In order to lower the position of the bottom end portion of the rear suspension, it is conceivable to locate the cross member to a lower position so that the size of the cross member in the vehicle up-down direction is decreased. In this case, the thickness of the cross member is decreased, and thus the rigidity thereof is decreased. In contrast, according to a preferred embodiment of the present invention, the position of the bottom end portion of the rear suspension is lowered while the rigidity of the cross member is kept high with certainty.

As described above, according to a preferred embodiment of the present invention, a straddle-type vehicle that improves the contact between the rider's foot and the ground and allows the rear suspension to be attached the rear arm easily while providing a sufficient level of riding comfort of the rider, a sufficient compactness in the vehicle front-right direction and a sufficient capacity of the silencer with certainty is reliably provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 1:
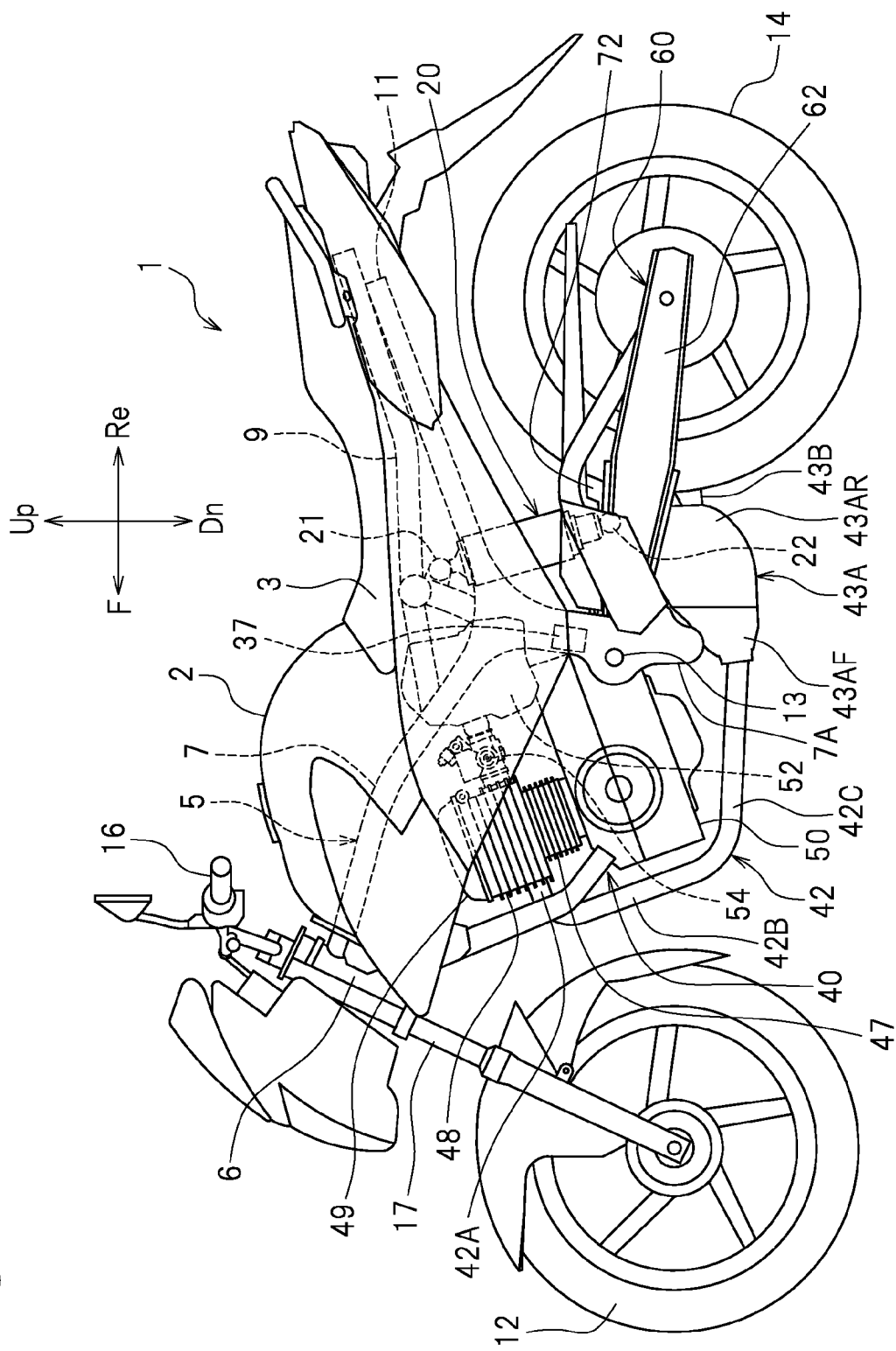
FIG. 1 is a left side view showing a motorcycle according to a preferred embodiment of the present invention.

Hereinafter, preferred embodiments of the present invention will be described. As shown in FIG. 1, a straddle-type vehicle according to a first preferred embodiment is a motorcycle 1. The motorcycle 1 is not limited to any specific type, and may be of a so-called scooper-type, a moped type, an off-road type, an on-road type or the like. A straddle-type vehicle according to the present invention is not limited to a motorcycle, and may be an ATV (All-Terrain Vehicle), a ROV ("Recreational Off-Highway Vehicle"), a four-wheel buggy or the like. A "straddle-type vehicle" refers to a vehicle which a rider rides astride.

In the following description, unless otherwise specified, the terms "front", "rear", "left", "right", "up" and "down" respectively mean front, rear, left, right, up and down as seen from a rider of the motorcycle 1 sitting on a seat 3. The terms "up" and "down" respectively correspond to the vertically upward direction and the vertically downward direction when the motorcycle 1 is still on a horizontal surface. In the figures, F, Re, L, R, Up and Dn respectively represent front, rear, left, right, up and down.

As shown in FIG. 1, the motorcycle 1 includes a head pipe 6, a vehicle body frame 5 secured to the head pipe 6, and a rear arm 60 coupled to the vehicle body frame 5. The vehicle body frame 5 includes a main frame 7, a seat frame 9, and a back stay 11. The main frame 7 extends obliquely in a rearward and downward direction from the head pipe 6. The seat frame 9 extends obliquely in a rearward and upward direction from a middle position of the main frame 7. The back stay 11 is located below the main seat frame 9 and extends obliquely in a rearward and upward direction from a rear portion of the main frame 7. The main frame 7 and the rear arm 60 are coupled to each other via a pivot shaft 13. The rear arm 60 is swingably coupled to the main frame 7. Alternatively, the rear arm 60 may be swingably coupled to an engine 40 described below.

The head pipe 6 supports a steering shaft (not shown), and a handle 16 is provided at a top portion of the steering shaft. A front fork 17 is provided at a bottom portion of the steering shaft. A front wheel 12 is rotatably supported by a bottom end portion of the front fork 17. A fuel tank 2 is located rearward of the head pipe 6. The fuel tank 2 is supported by the main frame 7. The seat 3 is located rearward of the fuel tank 2. The seat 3 is supported by the seat frame 9. The seat 3 may be supported by the seat frame 9 directly or indirectly.

Figure 2:
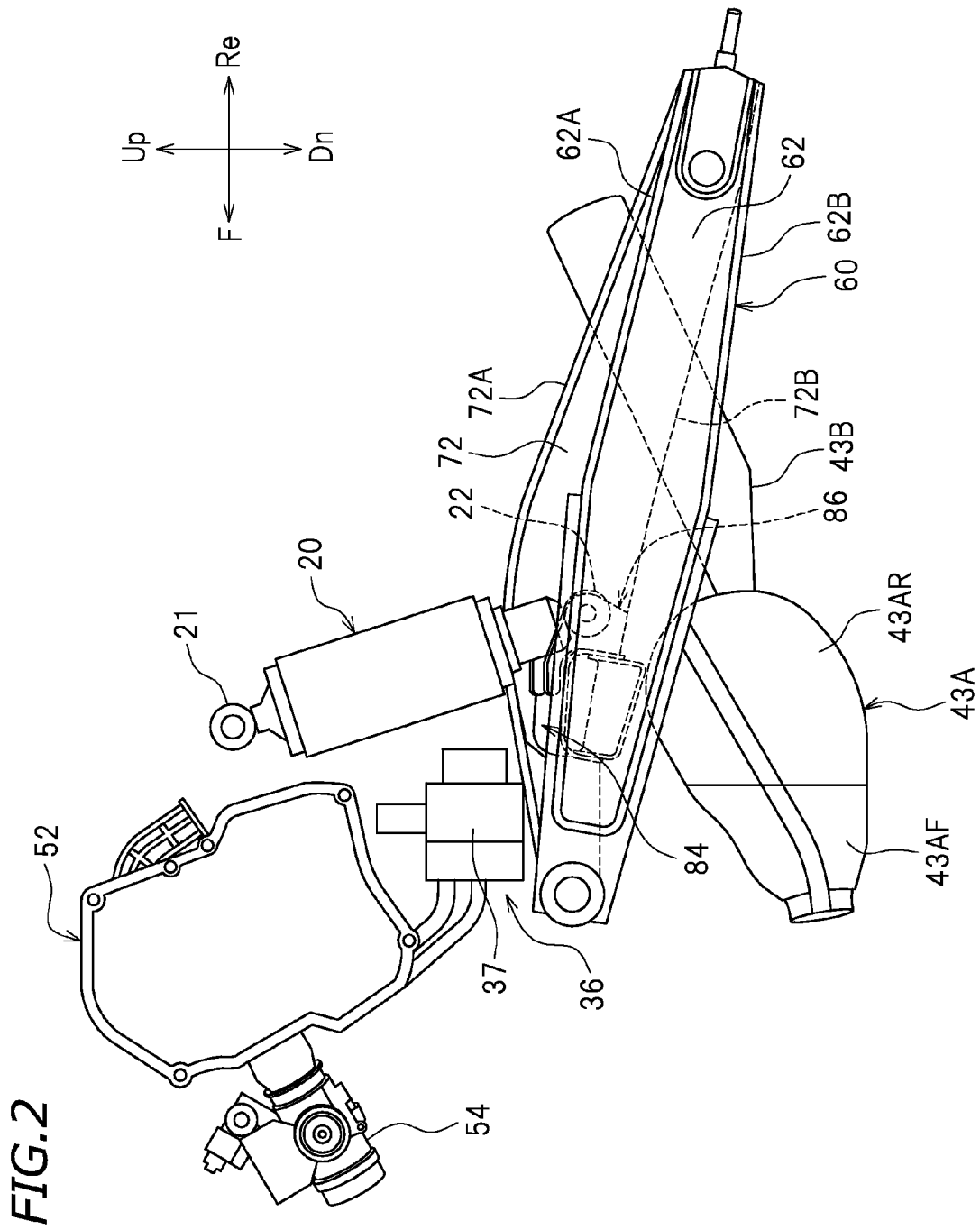
FIG. 2 is a side view showing a structure of a rear suspension and the vicinity thereof according to a preferred embodiment of the present invention.
Figure 3:
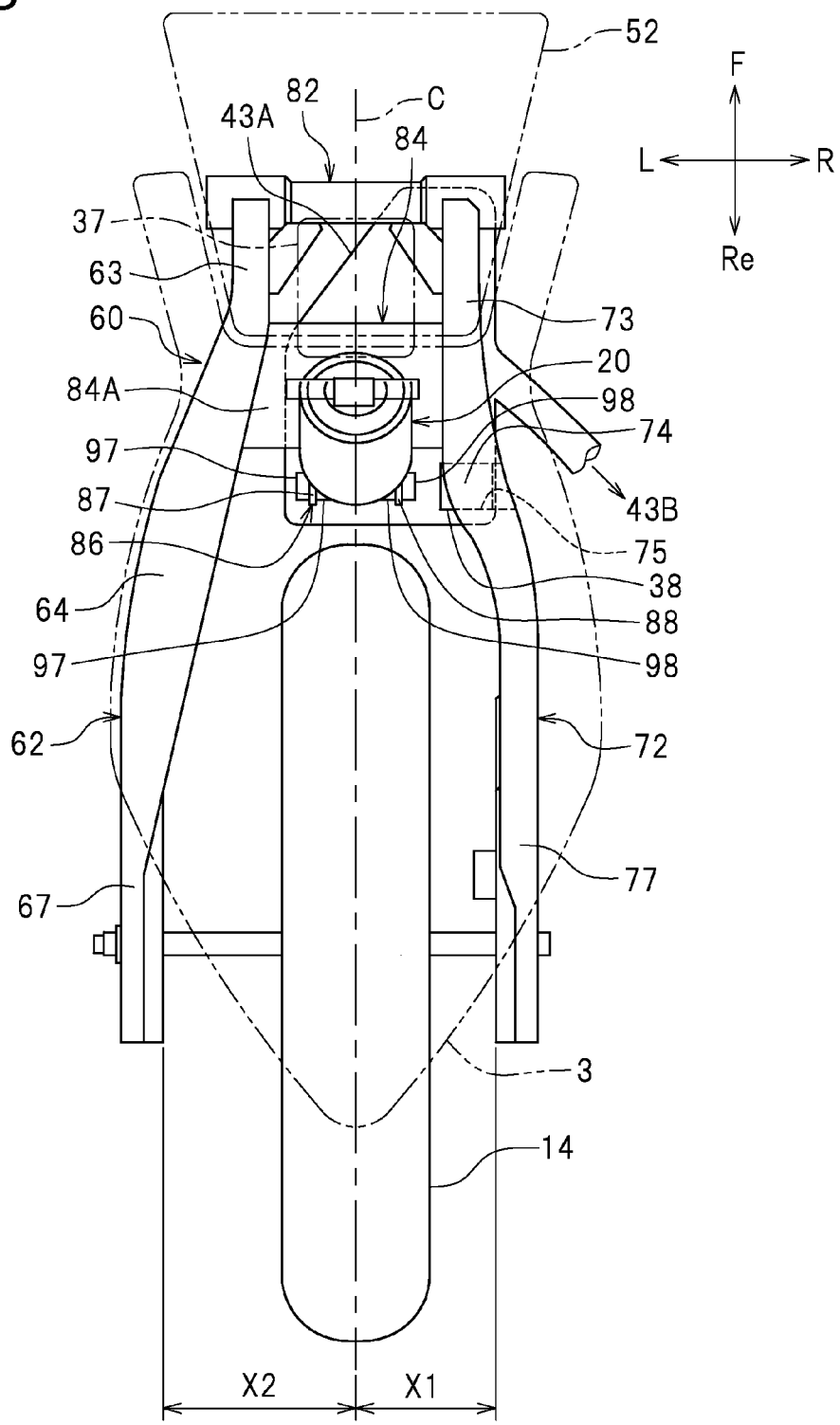
FIG. 3 is a plan view showing a structure of a rear arm and the vicinity thereof according to a preferred embodiment of the present invention.

The rear suspension 20 is located below the seat 3. A front end of the rear suspension 20 is located rearward of a front end of the seat 3. A rear end of the rear suspension 20 is located frontward of a rear end of the seat 3. As shown in FIG. 3, as seen in a vehicle plan view, the rear suspension 20 overlaps the seat 3. As shown in FIG. 1, the rear suspension 20 is located in an inclining posture. An angle defined by an axial direction of the rear suspension 20 and a horizontal line preferably is larger than 45 degrees, for example. The rear suspension 20 is configured such that the size thereof in a vehicle up-down direction is larger than the size thereof in a vehicle front-rear direction. A top end portion 21 of the rear suspension 20 is swingably supported by the seat frame 9. A bottom end portion 22 of the rear suspension 20 is swingably supported by the rear arm 60. The bottom end portion 22 of the rear suspension 20 is provided with a bolt insertion hole 23 (see FIG. 9). A bolt 92 described later is inserted through the bolt insertion hole 23. A portion of the rear suspension 20 except for the top end portion 21 and the bottom end portion 22 preferably is cylindrical or substantially cylindrical. A rear wheel 14 is rotatably supported by a rear end portion of the rear arm 60. The rear wheel 14 is located rearward of the rear suspension 20. As shown in FIG. 2, the rear arm 60 is inclined such that a top end thereof is located frontward of a bottom end thereof.

As shown in FIG. 1, the motorcycle 1 includes the engine 40, which is an internal combustion engine. The engine 40 is non-swingably supported by the main frame 7. The engine 40 is located frontward of the rear arm 60. It is preferable that at least a portion of the engine 40 is located frontward of the rear arm 60. The engine 40 includes a crankcase 50, a cylinder body 47, a cylinder head 48, and a cylinder head cover 49. The cylinder body 47 extends upward from a front portion of the crankcase 50. The cylinder head 48 is located above the cylinder body 47 and is connected to the cylinder body 47. The cylinder head cover 49 is located above the cylinder head 48 and is connected to the cylinder head 48.

The motorcycle 1 includes an air cleaner 52, an exhaust pipe 42, and a first silencer 43A. The air cleaner 52 is located rearward of the engine 40. The air cleaner 52 is located rearward of the cylinder body 47, the cylinder head 48 and the cylinder head cover 49. The air cleaner 52 is located frontward of the rear suspension 20. The air cleaner 52 is connected to the engine 40 via a throttle body 54. There is no specific limitation on the shape or the size of the air cleaner 52. In this preferred embodiment, the size of the air cleaner 52 in the vehicle up-down direction is larger than the size thereof in the vehicle front-rear direction. A top end of the air cleaner 52 is located above a top end of the rear suspension 20, and a bottom end of the air cleaner 52 is located below a bottom end of the rear suspension 20. The bottom end of the air cleaner 52 is located below the top end of the rear arm 60. The bottom end portion of the air cleaner 52 is located above the top end of the rear arm 60. A front end of the air cleaner 52 is located frontward of the rear end of the fuel tank 2. A rear end of the air cleaner 52 is located rearward of the front end of the seat 3.

The exhaust pipe 42 is coupled to the engine 40. In more detail, the exhaust pipe 42 includes a first portion 42A extending obliquely in a forward and downward direction from the cylinder head 48, a second portion 42B extending obliquely in a rearward and downward direction from the first portion 42A, and a third portion 42C extending rearward from the second portion 42B. The third portion 42C extends in a horizontal direction as seen in a vehicle side view. The first silencer 43A is coupled to a rear end portion of the exhaust pipe 42. The first silencer 43A is coupled to a second silencer 43B extending rearward. A cross-sectional area in the horizontal direction of the first silencer 43A is larger than a cross-sectional area in the horizontal direction of the exhaust pipe 42. Exhaust gas flowing from the exhaust pipe 42 to the first silencer 43A expands in the first silencer 43A. The first silencer 43A is separate from the exhaust pipe 42 and is coupled to the exhaust pipe 42. The first silencer 43A is coupled to the third portion 42C of the exhaust pipe 42. Specifically, the first silencer 43A is coupled to the portion 42C, of the exhaust pipe 42, extending in the horizontal direction as seen in a vehicle side view. The first silencer 43A is located below the rear suspension 20 (see FIG. 2). The first silencer 43A preferably is box-shaped, for example. As shown in FIG. 2, the first silencer 43A is directed upward as extending rearward as seen in a vehicle side view. The first silencer 43A includes a front portion 43AF and a rear portion 43AR. A top end of the front portion 43AF of the first silencer 43A is located below a top end of the rear portion 43AR of the first silencer 43A. As shown in FIG. 1, a portion of the front portion 43AF of the first silencer 43A is located below a bottom end portion 7A of the main frame 7. This is why the top end of the front portion 43AF is located below the top end of the rear portion 43AR. A portion of the rear portion 43AR of the first silencer 43A is located below the rear suspension 20. A portion of the first silencer 43A overlaps the rear arm 60 in a vehicle side view. As shown in FIG. 3, as seen in a vehicle plan view, a portion of the first silencer 43A overlaps a right arm portion 72 of the rear arm 60 described below but does not overlap a left arm portion 62 of the rear arm 60. As seen in a vehicle plan view, the first silencer 43A overlaps the rear suspension 20. As seen in a vehicle plan view, the first silencer 43A overlaps the seat 3. As seen in a vehicle plan view, the first silencer 43A, the seat 3 and the rear suspension 20 overlap each other. The second silencer 43B is separate from the first silencer 43A and is connected to the first silencer 43A. As shown in FIG. 2, the second silencer 43B preferably is cylindrical or substantially cylindrical, for example. The second silencer 43B extends obliquely in a rearward and upward direction from the first silencer 43A. As seen in a vehicle side view, the second silencer 43B overlaps the rear arm 60. There is no specific limitation on the shape of the first silencer 43A or the second silencer 43B. The first silencer 43A and the second silencer 43B may be integral with each other. The motorcycle 1 does not need to include the second silencer 43B.

As shown in FIG. 2, the motorcycle 1 includes an anti-lock brake device 36. The anti-lock brake device 36 includes a hydraulic unit 37. The hydraulic unit 37 controls an oil pressure of a brake liquid to be increased or decreased. The hydraulic unit 37 is located below the air cleaner 52. A front end of the hydraulic unit 37 is located frontward of the rear end of the air cleaner 52. A rear end of the hydraulic unit 37 is located rearward of the rear end of the air cleaner 52. The hydraulic unit 37 is located frontward of the rear suspension 20. A top end of the hydraulic unit 37 is located below the top end of the rear suspension 20. A bottom end of the hydraulic unit 37 is located above the bottom end of the rear suspension 20. The rear end of the hydraulic unit 37 is located rearward of the front end of the rear suspension 20. The hydraulic unit 37 is located above the rear arm 60. The front end of the hydraulic unit 37 is located rearward of a front end of the rear arm 60. The rear end of the hydraulic unit 37 is located frontward of the rear end of the rear arm 60. The hydraulic unit 37 is located above the first silencer 43A. The front end of the hydraulic unit 37 is located rearward of a front end of the first silencer 43A. The rear end of the hydraulic unit 37 is located frontward of a rear end of the first silencer 43A.

As shown in FIG. 3, the rear arm 60 includes the left arm portion 62, the right arm portion 72, a first cross member 82 and a second cross member 84. The left arm portion 62 is located to the left of the rear wheel 14. The right arm portion 72 is located to the right of the rear wheel 14. The first cross member 82 couples a front end portion of the left arm portion 62 and a front end portion of the right arm portion 72 to each other. The first cross member 82 and the main frame 7 (see FIG. 1) are coupled to each other via the pivot shaft 13 (see FIG. 1). The second cross member 84 couples the left arm portion 62 and the right arm portion 72 to each other. The second cross member 84 is located rearward of the first cross member 82. The second cross member 84 includes a coupling portion 86 to which the bottom end portion 22 (see FIG. 2) of the rear suspension 20 is coupled. The bottom end portion 22 of the rear suspension 20 is coupled to the coupling portion 86 without any link mechanism being provided therebetween.

Figure 4:
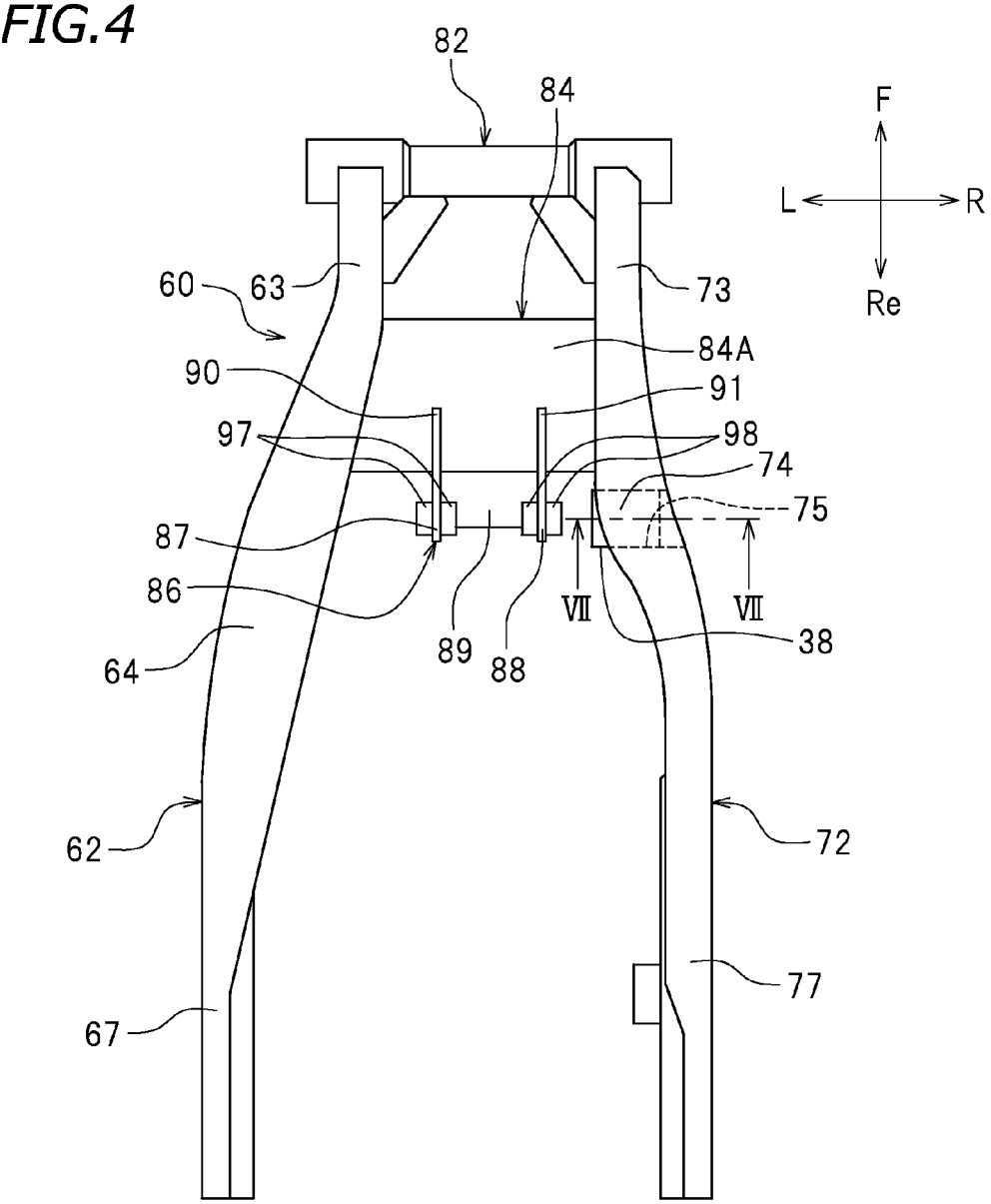
FIG. 4 is a plan view showing a structure of the rear arm according to a preferred embodiment of the present invention.

As shown in FIG. 4, as seen in a vehicle plan view, the right arm portion 72 includes a first straight portion 73 extending rearward straight from the first cross member 82, a right inclining portion 74 inclining obliquely in a rearward and rightward direction from a rear end of the first straight portion 73, and a second straight portion 77 extending rearward straight from a rear end of the right inclining portion 74. As seen in a vehicle plan view, the left arm portion 62 includes a first straight portion 63 extending rearward straight from the first cross member 82, a left inclining portion 64 inclining obliquely in a rearward and leftward direction from the first straight portion 63, and a second straight portion 67 extending rearward straight from a rear end of the left inclining portion 64. As shown in FIG. 3, distance X1 between the second straight portion 77 of the right arm portion 72 and vehicle center line C is shorter than distance X2 between the second straight portion 67 of the left arm portion 62 and vehicle center line C. The second straight portion 77 of the right arm portion 72 is closer to the rear wheel 14 than the second straight portion 67 of the left arm portion 62.

Figure 5:
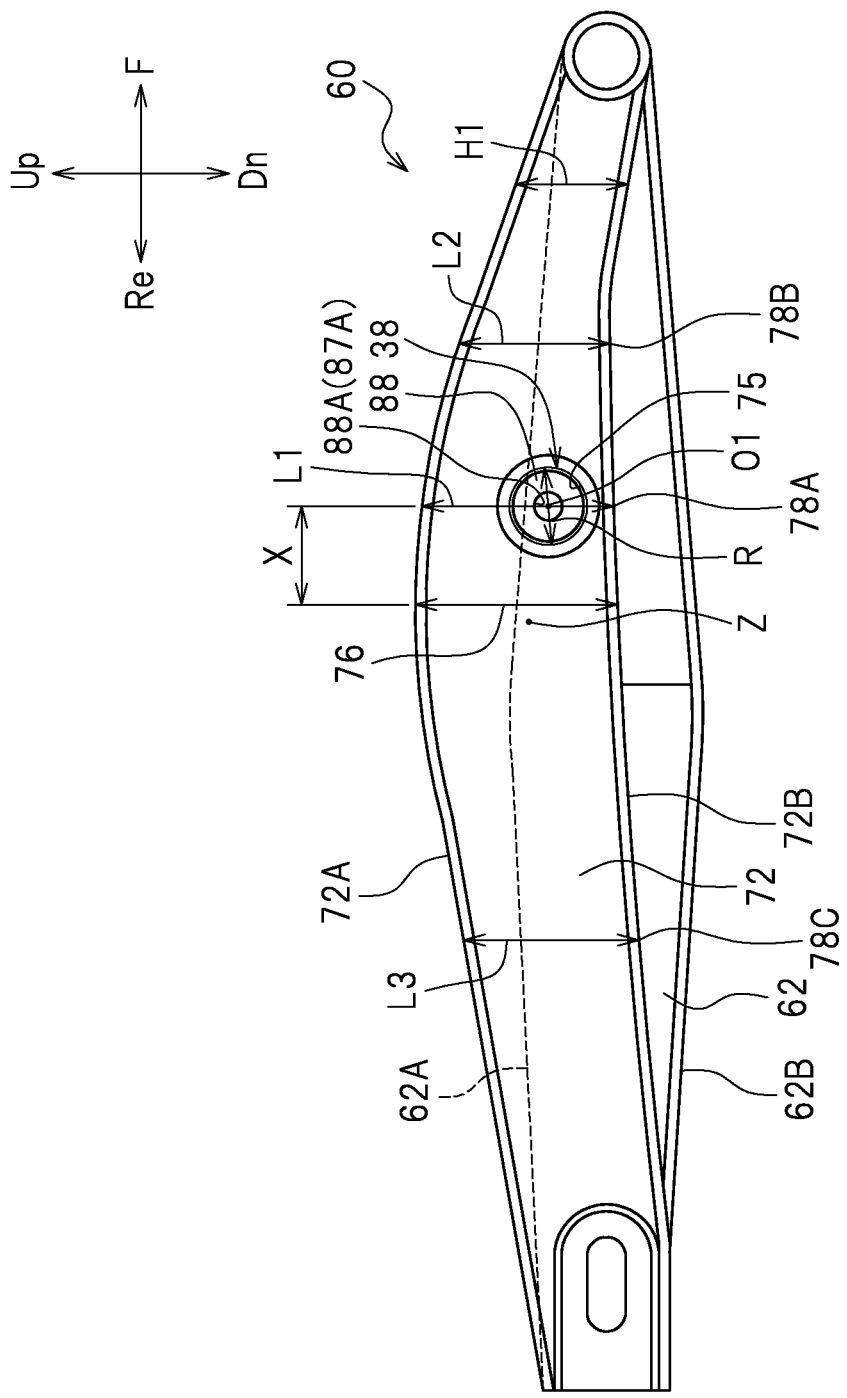
FIG. 5 is a right side view showing a structure of the rear arm according to a preferred embodiment of the present invention.

As shown in FIG. 5, a top edge 72A of the right arm portion 72 is at a higher level than a top edge 62A of the left arm portion 62. The top edge 72A of the right arm portion 72 may be partially located at a lower level than the top edge 62A of the left arm portion 62. In this preferred embodiment, the top edge 72A of the right arm portion 72 is entirely at a higher level than the top edge 62A of the left arm portion 62. A bottom edge 72B of the right arm portion 72 is at a lower level than the top edge 62A of the left arm portion 62. The bottom edge 72B of the right arm portion 72 may be partially located at a higher level than the top edge 62A of the left arm portion 62. In this preferred embodiment, the bottom edge 72B of the right arm portion 72 is entirely at a lower level than the top edge 62A of the left arm portion 62. The bottom edge 72B of the right arm portion 72 is at a higher level than a bottom edge 62B of the left arm portion 62. The bottom edge 72B of the right arm portion 72 may be partially located at a lower level than the bottom edge 62B of the left arm portion 62. In this preferred embodiment, the bottom edge 72B of the right arm portion 72 is entirely at a higher level than the bottom edge 62B of the left arm portion 62.

Figure 6:
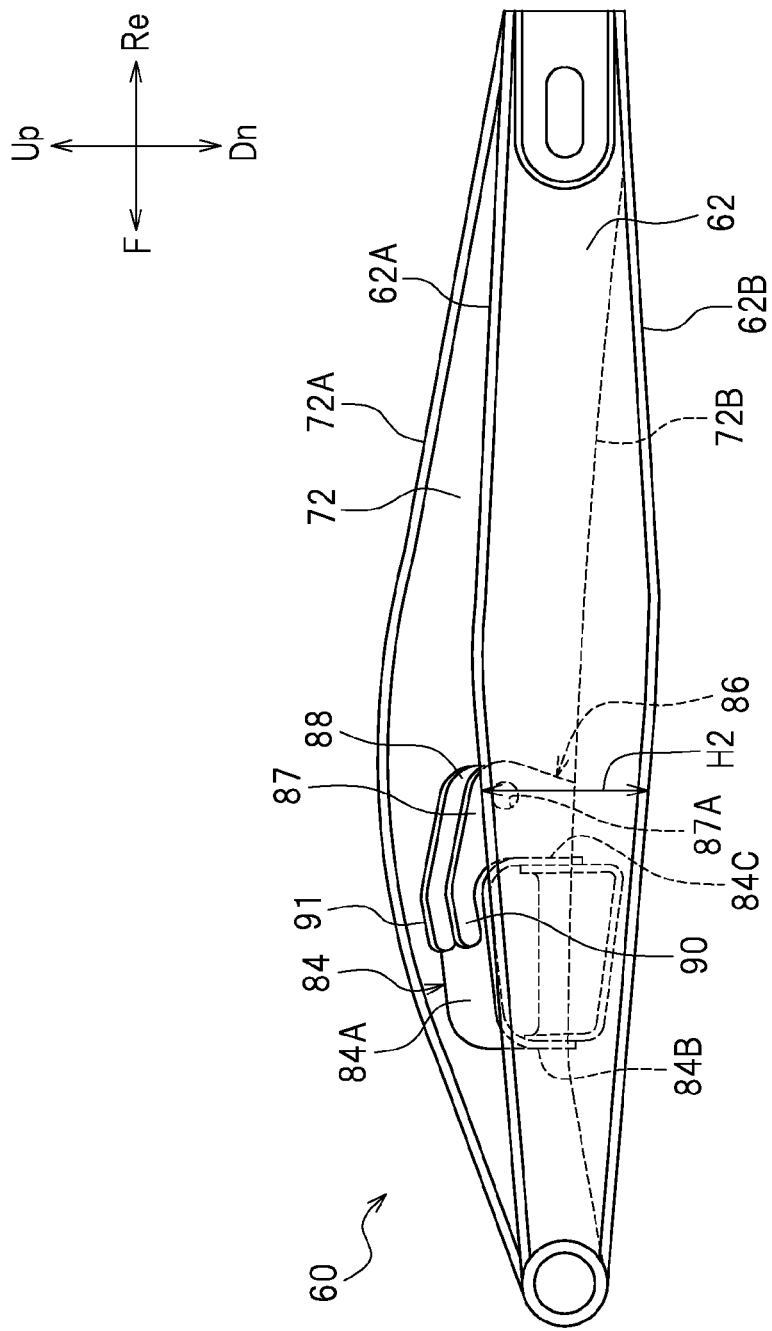
FIG. 6 is a left side view showing a structure of the rear arm according to a preferred embodiment of the present invention.

As shown in FIG. 5, the right arm portion 72 is configured such that a size H1 thereof in the vehicle up-down direction increases as the right arm portion 72 is closer to a rear portion thereof and farther from a front portion thereof and then the size H1 in the vehicle up-down direction is decreased. The right arm portion 72 may be configured such that the size H1 thereof in the vehicle up-down direction gradually increases as the right arm portion 72 is closer to the rear portion thereof and farther from the front portion thereof and then the size H1 in the vehicle up-down direction is gradually decreased. As shown in FIG. 6, the left arm portion 62 is configured such that a size H2 thereof in the vehicle up-down direction increases as the left arm portion 62 is closer to a rear portion thereof and farther from a front portion thereof and then the size H2 in the vehicle up-down direction is decreased. The left arm portion 62 may be configured such that the size H2 thereof in the vehicle up-down direction gradually increases as the left arm portion 62 is closer to the rear portion thereof and farther from the front portion thereof and then size H2 in the vehicle up-down direction is gradually decreased. There is no specific limitation on the shape of the right arm portion 72 or the left arm portion 62.

Figure 7:
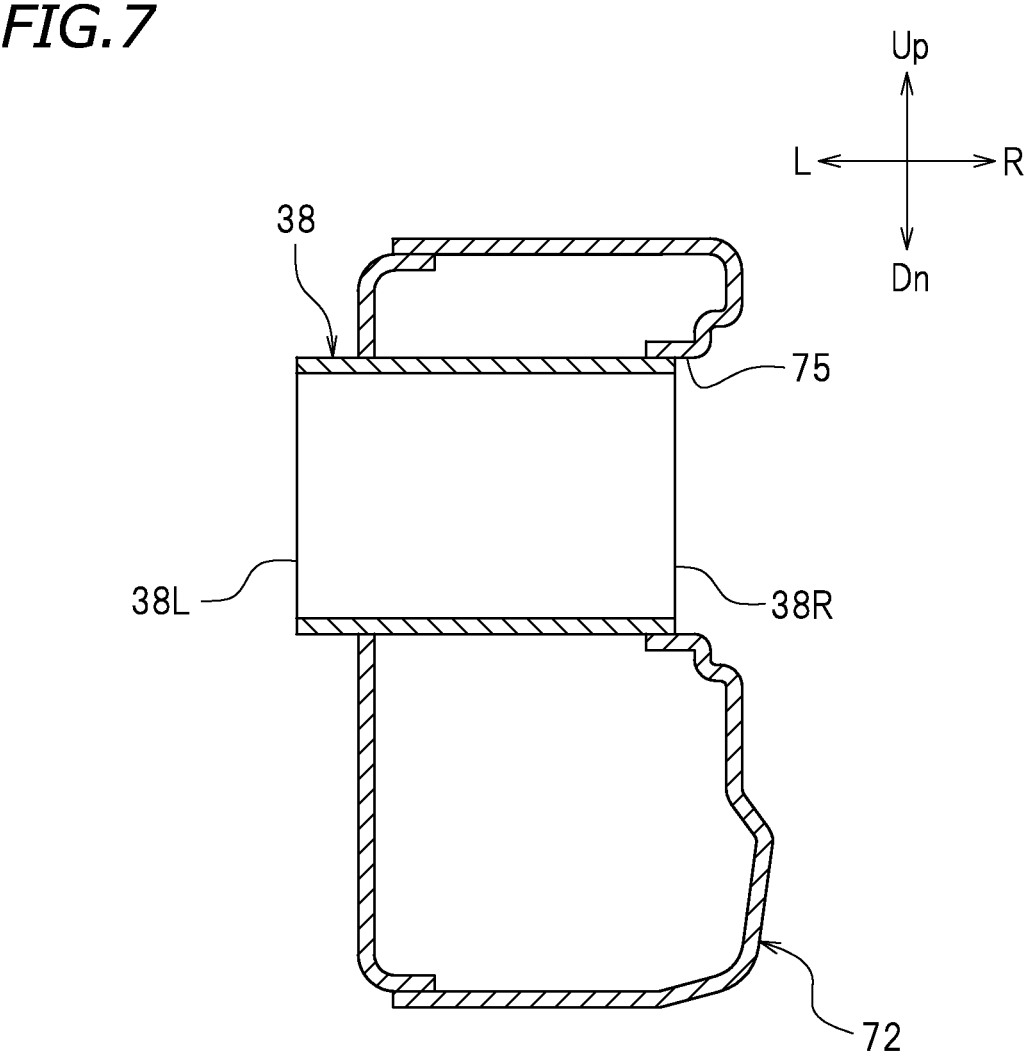
FIG. 7 is a cross-sectional view taken along line VII-VII in FIG. 4 and is a cross-sectional view of a right arm portion according to a preferred embodiment of the present invention.

As shown in FIG. 5, the right arm portion 72 is provided with a through-hole 75 extending therethrough in a vehicle width direction. In this preferred embodiment, the "vehicle width direction" refers to a vehicle left-right direction. The through-hole 75 is located between the top edge 72A and the bottom edge 72B of the right arm portion 72. In this preferred embodiment, the through-hole 75 preferably is circular or substantially circular. There is no specific limitation on the shape of the through-hole 75, and the through-hole 75 may be elliptical, quadrangular, hexagonal, or of any other shape. As described below, the coupling portion 86 of the rear arm 60 is provided with bolt insertion holes 87A and 88A. As seen in a vehicle side view, the through-hole 75 overlaps the bolt insertion holes 87A and 88A of the coupling portion 86. As shown in FIG. 7, a pipe 38 extending through the through-hole 75 in the vehicle width direction. A right end 38R of the pipe 38 is located in the through-hole 75. A left end 38L of the pipe 38 is located outside the through-hole 75. There is no specific limitation on the shape of the pipe 38, and the shape of the pipe 38 can be designed optionally in accordance with the through-hole 75. It is not absolutely necessary that the pipe 38 extends through the through-hole 75.

As shown in FIG. 4, the through-hole 75 is preferably provided in a portion that is longest in the vehicle width direction in the right inclining portion 74 of the right arm portion 72. The through-hole 75 may be provided in a portion that is longest in the vehicle width direction in the right inclining portion 74 of the right arm portion 72 and the left inclining portion 64 of the left arm portion 62. There is no specific limitation on the position where the through-hole 75 is provided. As shown in FIG. 5, size L1 in the vehicle up-down direction of a first portion 78A, of the right arm portion 72, where the through-hole 75 is provided is larger than size L2 in the vehicle up-down direction of a second portion 78B, of the right arm portion 72, that is located frontward of the first portion 78A where the through-hole 75 is provided. Size L1 in the vehicle up-down direction of the first portion 78A is larger than size L3 in the vehicle up-down direction of a third portion 78C, of the right arm portion 72, that is located rearward of the first portion 78A where the through-hole 75 is provided. The through-hole 75 may be provided in a portion 76 having the maximum size in the vehicle up-down direction in the right arm portion 72, or in the vicinity of the portion 76 having the maximum size in the vehicle up-down direction in the right arm portion 72. For example, distance X in the vehicle front-rear direction between the portion 76 having the maximum size in the vehicle up-down direction in the right arm portion 72 and center O1 of the through-hole 75 may be at most about twice the diameter R of the through-hole 75, for example. As seen in a vehicle side view, center O1 of the through-hole 75 is located below center position Z in the vehicle up-down direction of the right arm portion 72. Center position Z in the vehicle up-down direction of the right arm portion 72 refers to the center position in the vehicle up-down direction between a top end of the right arm portion 72 and a bottom end of the right arm portion 72.

As seen in a vehicle side view, the top edge 72A of the first portion 78A, of the right arm portion 72, in which the through-hole 75 is provided is located above the top edge 62A of a portion, of the left arm portion 62, facing the through-hole 75 (in other words, the portion located on a line extending from the axis of the through-hole 75; the extending line extends in a direction perpendicular to the sheet of paper of FIG. 5). As seen in a vehicle side view, the bottom edge 72B of the first portion 78A, of the right arm portion 72, in which the through-hole 75 is provided is located above the bottom edge 62B of the portion, of the left arm portion 62, facing the through-hole 75. As shown in FIG. 2, at least a portion of the first silencer 43A is located below the through-hole 75. At least a portion of the first silencer 43A is located below the second cross member 84.

In this preferred embodiment, the through-hole 75 is provided in the right arm portion 72. The through-hole 75 may be provided in at least one of the left arm portion 62 and the right arm portion 72. The through-hole 75 may be provided in each of the right arm portion 72 and the left arm portion 62.

Figure 8:
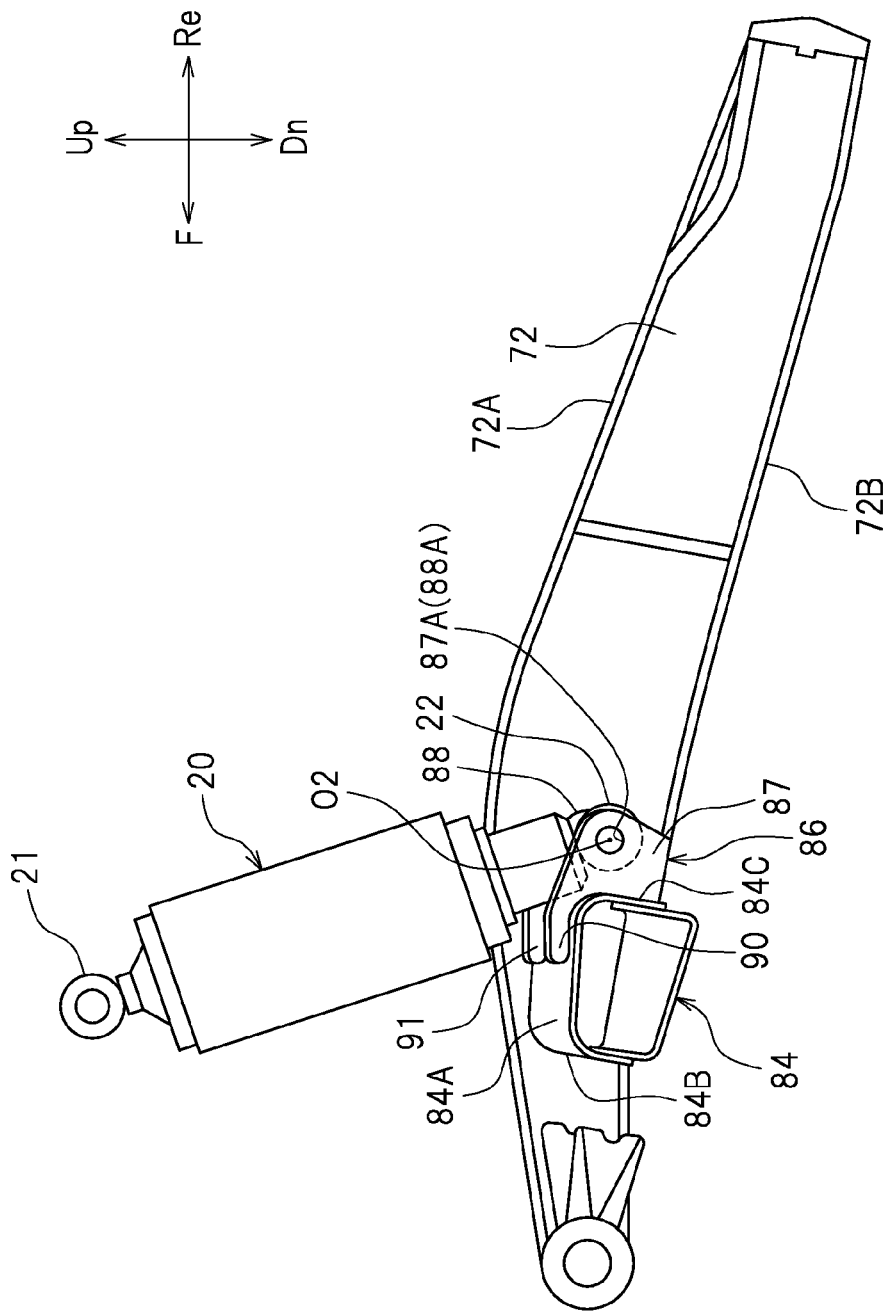
FIG. 8 is a side view showing a portion of a structure of the rear arm according to a preferred embodiment of the present invention.
Figure 9:
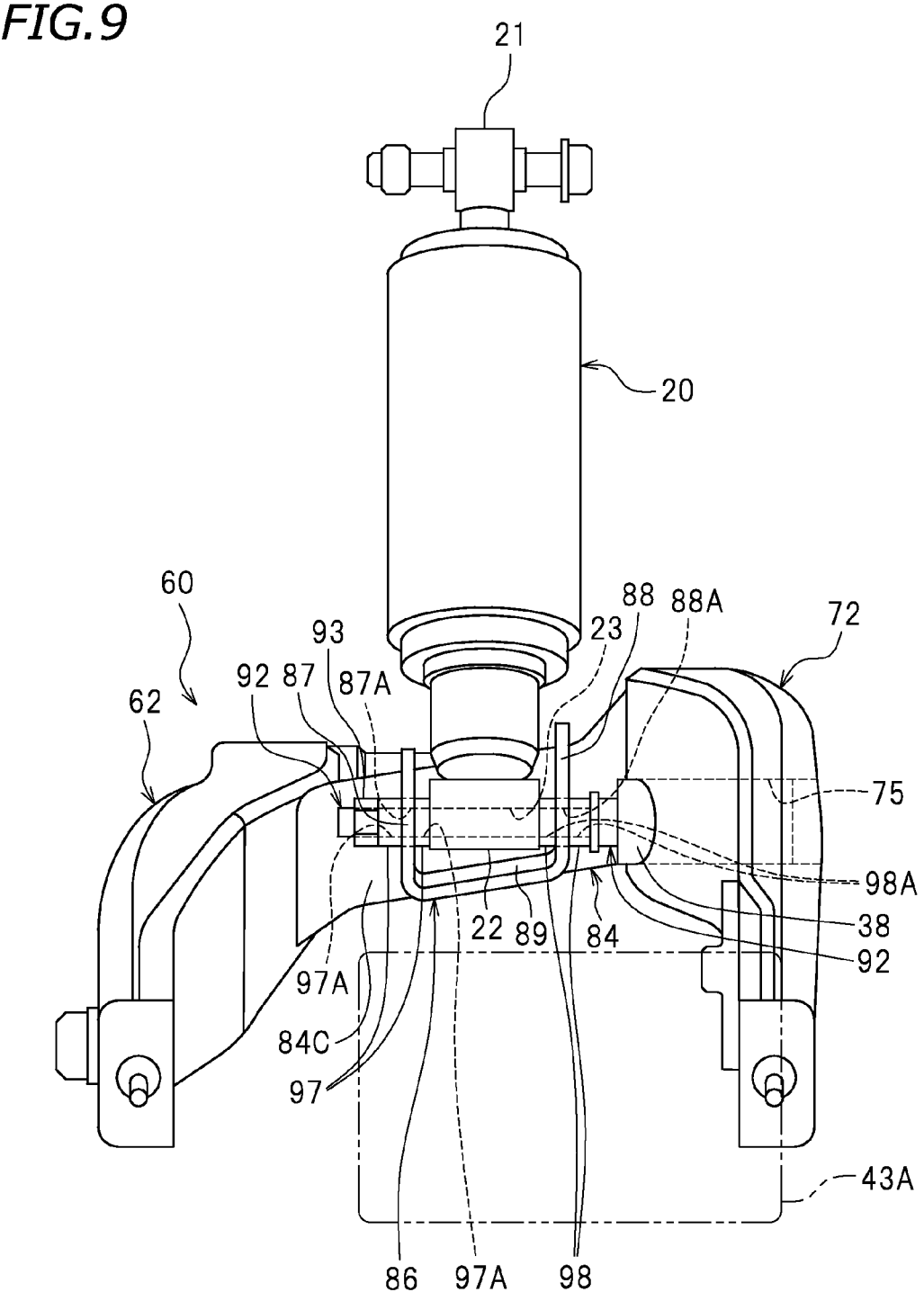
FIG. 9 is a rear view showing the rear suspension and the rear arm according to a preferred embodiment of the present invention.

As shown in FIG. 8, the second cross member 84 includes a front wall 84B and a rear wall 84C. The front wall 84B extends from the left arm portion 62 (see FIG. 3) to the right arm portion 72. The front wall 84B extends in the vehicle up-down direction. The rear wall 84C extends from the left arm portion 62 to the right arm portion 72. The rear wall 84C extends in the vehicle up-down direction. The rear wall 84C is located rearward of the front wall 84B. As shown in FIG. 9, the second cross member 84 extends downward from the right arm portion 72 toward the left arm portion 62. The second cross member 84 is inclined with respect to the horizontal direction from the right arm portion 72 toward the left arm portion 62. The second cross member 84 is inclined with respect to the horizontal direction so as to be lowered as being closer to the left arm portion 62 and farther from the right arm portion 72. The second cross member 84 may extend downward from the left arm portion 62 toward the right arm portion 72. The second cross member 84 may be inclined with respect to the horizontal direction from the left arm portion 62 toward the right arm portion 72. The second cross member 84 may be inclined with respect to the horizontal direction so as to be lowered as being closer to the right arm portion 72 and farther from the left arm portion 62. The second cross member 84 does not need to be located between the right arm portion 72 and the left arm portion 62 as inclining with respect to the horizontal direction, and may be located in the horizontal direction. In this preferred embodiment, the "horizontal direction" refers to a direction parallel or substantially parallel to the horizontal surface, and more specifically, a direction intersecting the vertical direction at the right angle.

As described above, the second cross member 84 includes the coupling portion 86 to which the bottom end portion 22 of the rear suspension 20 is coupled. The coupling portion 86 is provided on the rear wall 84C of the second cross member 84. As shown in FIG. 2, in this preferred embodiment, as seen in a vehicle side view, the coupling portion 86 is located between the top edge 72A of the right arm portion 72 and the bottom edge 62B of the left arm portion 62. As seen in a vehicle side view, the coupling portion 86 is located between the top edge 72A and the bottom edge 72B (see FIG. 5) of the right arm portion 72. As shown in FIG. 3, as seen in a plan view, the coupling portion 86 is located between the left inclining portion 64 of the left arm portion 62 and the right inclining portion 74 of the right arm portion 72.

As shown in FIG. 9, the coupling portion 86 includes a left wall 87, a right wall 88, and a bottom wall 89. As shown in FIG. 8, the coupling portion 86 includes a left projection portion 90 and a right projection portion 91. The left wall 87 extends in the vehicle up-down direction. The left wall 87 is connected to the rear wall 84C of the second cross member 84. The left wall 87 is secured to the rear wall 84C by welding, for example. The right wall 88 extends in the vehicle up-down direction. The right wall 88 is located to the right of the left wall 87. The right wall 88 is connected to the rear wall 84C of the second cross member 84. The right wall 88 is secured to the rear wall 84C by welding, for example. The bottom wall 89 extends between a bottom end of the left wall 87 and a bottom end of the right wall 88. The bottom wall 89 extends downward from the right wall 88 to the left wall 87. The bottom wall 89 is inclined with respect to the horizontal direction. Since the bottom wall 89 is inclined, the coupling portion 86 is highly rigid against the movement of the rear suspension 20 in an up-down direction. The left projection portion 90 extends from a top end of the left wall 87 toward the second cross member 84. The left projection portion 90 is connected to a top wall 84A of the second cross member 84. The left projection portion 90 is secured to the top wall 84A by welding, for example. The right projection portion 91 is located to the right of the left projection portion 90. The right projection portion 91 extends from a top end of the right wall 88 toward the second cross member 84. The right projection portion 91 is connected to the top wall 84A of the second cross member 84. The right projection portion 91 is secured to the top wall 84A by welding, for example.

As shown in FIG. 9, the left wall 87 of the coupling portion 86 is provided with the bolt insertion hole 87A extending therethrough in the vehicle width direction. A collar 97 is attached to each of a left surface and a right surface of the left wall 87. Each collar 97 is provided with a bolt insertion hole 97A extending therethrough in the vehicle width direction. The right wall 88 of the coupling portion 86 is provided with the bolt insertion hole 88A extending therethrough in the vehicle width direction. A collar 98 is attached to each of a left surface and a right surface of the right wall 88. Each collar 98 is provided with a bolt insertion hole 98A extending therethrough in the vehicle width direction. A bolt 92 is inserted through the bolt insertion holes 23, 87A, 88A, 97A and 98A and secures the coupling portion 86 and the bottom end portion 22 of the rear suspension 20 to each other. The bolt 92 is secured by a nut 93 located to the left of each collar 97. The bolt 92 may be located inside the through-hole 75 of the right arm portion 72. As seen in a vehicle side view, the bolt insertion hole 87A, the bolt insertion hole 88A and the through-hole 75 overlap each other. As seen in a vehicle side view, the bolt insertion holes 87A and 88A are located between the top edge 72A and the bottom edge 72B of the right arm portion 72 (see FIG. 5). As shown in FIG. 8, as seen in a vehicle side view, the bolt insertion holes 87A and 88A are located below a top end of the second cross member 84 and also above a bottom end of the second cross member 84. Center O2 of the bolt insertion holes 87A and 88A is located below a top end of the rear wall 84C of the second cross member 84 and above a bottom end of the rear wall 84C. The bolt insertion holes do not need to be provided in both of the left wall 87 and the right wall 88, and may be provided only in the wall closer to the arm portion in which the through-hole 75 is provided. The collar 97 may be attached to only the left surface or the right surface of the left wall 87. The collar 97 does not need to be attached to the left wall 87. The collar 98 may be attached to only the left surface or the right surface of the right wall 88. The collar 98 does not need to be attached to the right wall 88.

As described above, in the motorcycle 1 in this preferred embodiment, as shown in FIG. 2, the second cross member 84 includes the coupling portion 86 that is coupled to the bottom end portion 22 of the rear suspension 20. As seen in a vehicle side view, the bolt insertion holes 87A and 88A of the coupling portion 86 are located between the top edge 72A and the bottom edge 72B of the right arm portion 72. The bolt insertion holes 87A and 88A of the coupling portion 86 are not located above the top edge 72A of the right arm portion 72. Therefore, the position of the bottom end portion 22 of the rear suspension 20 is lowered. Hence, even in the case where the rear suspension 20 is configured such that the size thereof in the vehicle up-down direction is larger than the size thereof in the vehicle front-rear direction, the position of the rear suspension 20 is lowered without decreasing the size of the rear suspension 20 in the axial direction. As a result, the position of the seat 3 located above the rear suspension 20 is lowered while a sufficient level of riding comfort is provided to the rider with certainty. The bolt insertion holes 87A and 88A of the coupling portion 86 are not located below the bottom edge 72B of the right arm portion 72. Therefore, the position of the bottom end portion 22 of the rear suspension 20 is prevented from being excessively low. This provides a sufficiently large space for the first silencer 43A below the coupling portion 86. Thus, the first silencer 43A located below the rear suspension 20 has a sufficient capacity with certainty.

If it is attempted to lower the position of the seat 3 without changing the size of the rear suspension 20 in the axial direction in the state where the bolt insertion holes 87A and 88A of the coupling portion 86 are located above the top edge 72A of the right arm portion 72, the bottom end portion 22 of the rear suspension 20 needs to be located farther rearward. A reason for this is that where the bottom end portion 22 of the rear suspension 20 is located farther rearward, the size of the rear suspension 20 in the vehicle up-down direction can be decreased. However, in this case, the rear suspension 20 and the rear wheel 14 interfere with each other. In order to avoid such interference, the rear wheel 14 needs to be located farther rearward. This causes a problem that the length of the motorcycle 1 in the vehicle front-rear direction is increased. In contrast, according to this preferred embodiment, the rear suspension 20 preferably is configured such that the size thereof in the vehicle up-down direction is larger than the size thereof in the vehicle front-rear direction. Therefore, it is not needed to locate the bottom end portion 22 of the rear suspension 20 farther rearward in order to decrease the size thereof in the vehicle up-down direction. According to this preferred embodiment, the rear wheel 14 does not need to be located farther rearward, and thus the motorcycle 1 is kept compact in the vehicle front-rear direction with certainty.

Figure 10:
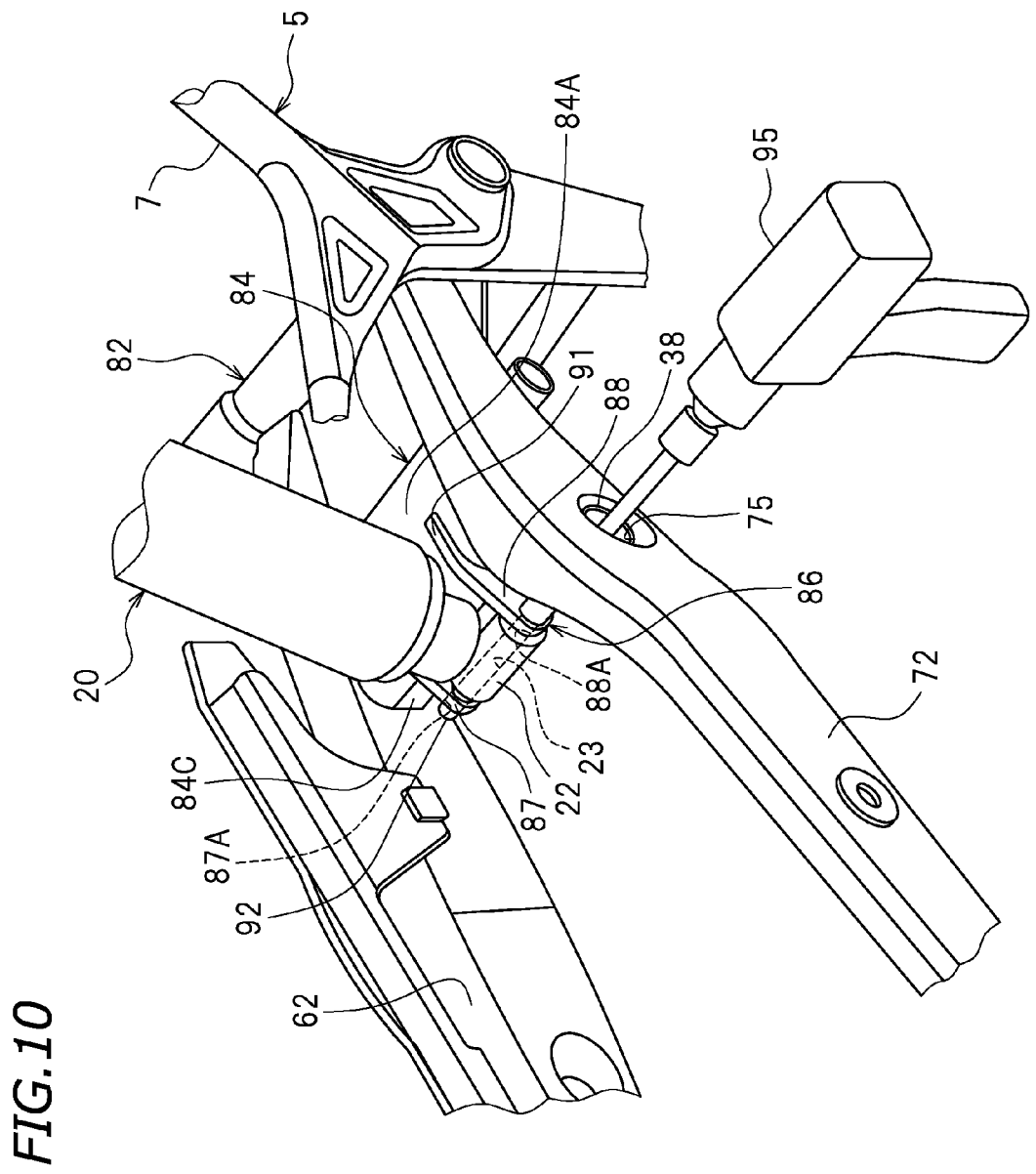
FIG. 10 is a perspective view showing a structure of the rear arm and the vicinity thereof according to a preferred embodiment of the present invention.

As shown in FIG. 5, as seen in a vehicle side view, the bolt insertion holes 87A and 88A of the coupling portion 86 overlap the through-hole 75 provided in the right arm portion 72. Therefore, as shown in FIG. 10, the bottom end portion 22 of the rear suspension 20 is easily attached to the coupling portion 86 by inserting a tool 95 into the through-hole 75 from a position to the side of the through-hole 75 in the vehicle. In FIG. 10, the collars 97 and 98 are omitted so that the attached state of the coupling portion 86 and the bottom end portion 22 of the rear suspension 20 is easily appreciated. As can be seen, according to this preferred embodiment, the bottom end portion 22 of the rear suspension 20 and the coupling portion 86 are attached to each other easily like in the case where the bolt insertion holes 87A and 88A of the coupling portion 86 are located above the top edge 72A of the right arm portion 72 or in the case where the bolt insertion holes 87A and 88A of the coupling portion 86 are located below the bottom edge 72B of the right arm portion 72. Even when the position of the bottom end portion 22 of the rear suspension 20 is raised in order to lower the level of the seat 3 so as to provide a sufficient capacity of the first silencer 43A with certainty, the bottom end portion 22 of the rear suspension 20 and the coupling portion 86 are attached to each other easily.

The through-hole 75 preferably extends through the right arm portion 72 in the vehicle width direction. In the right arm portion 72, the through-hole 75 is closed along the circumference thereof, and the through-hole 75 is enclosed along the entire circumference thereof. Therefore, as compared with the case where the top edge 72A of the right arm portion 72 is recessed or the bottom edge 72B of the right arm portion 72 is recessed instead of the through-hole 75 being provided in the right arm portion 72, the rigidity of the right arm portion 72 can be kept high.

Therefore, this preferred embodiment provides a motorcycle 1 that significantly improves the contact between the rider's foot and the ground and allows the rear suspension 20 to be attached to the rear arm 60 easily while providing a sufficient level of riding comfort of the rider, a sufficient compactness in the vehicle front-rear direction and a sufficient capacity of the first silencer 43A with certainty.

There may be cases where other vehicle components are located around the rear suspension 20. In the motorcycle 1, which is strongly required to be compact, the vehicle components tend to be located close to each other. In order to decrease the size of the motorcycle 1, it is important that the components should be located close to each other while being prevented from interfering with each other. As shown in FIG.

2, in this preferred embodiment, the air cleaner 52 is located frontward of the rear suspension 20. Therefore, if the rear suspension 20 is inclined forward at a large angle in order to lower the level of the seat 3, the rear suspension 20 and the air cleaner 52 interfere with each other. If the capacity of the air cleaner 52 is decreased in order to avoid such interference, the rear suspension 20 can be inclined forward at a large angle, and thus the level of the seat 3 can be lowered. However, in this case, the air cleaner 52 cannot have a sufficient capacity. In contrast, in this preferred embodiment, as described above, the position of the bottom end portion 22 of the rear suspension 20 is lowered. Therefore, the level of the seat 3 is lowered without inclining the rear suspension 20 forward at a large angle. As a result, a space is provided with certainty frontward of the rear suspension 20. This allows the air cleaner 52 to have a sufficient capacity with certainty. Thus, according to the motorcycle 1 in this preferred embodiment, the air cleaner 52 has a sufficient capacity with certainty and the interference of the air cleaner 52 and the rear suspension 20 is avoided while the above-described effect is provided.

In this preferred embodiment, as shown in FIG. 2, the hydraulic unit 37 is located frontward of the rear suspension 20. Therefore, if the rear suspension 20 is inclined forward at a large angle in order to lower the level of the seat 3, the rear suspension 20 and the hydraulic unit 37 interfere with each other. However, in this preferred embodiment, as described above, the level of the seat 3 is lowered without inclining the rear suspension 20 forward at a large angle. This allows the hydraulic unit 37 to be located frontward of the rear suspension 20 in a compact manner. The space frontward of the rear suspension 20 is effectively used to install the hydraulic unit 37. In this preferred embodiment, as seen in a vehicle side view, the hydraulic unit 37 is located frontward of the rear suspension 20, below the air cleaner 52, and above the rear arm 60. The space that is frontward of the rear suspension 20, below the air cleaner 52, and above the rear arm 60 is effectively used to install the hydraulic unit 37. Therefore, the hydraulic unit 37 is located in a highly compact manner.

The vehicle component located frontward of the rear suspension 20 is not limited to the air cleaner 52 or the hydraulic unit 37. Another vehicle component can be located frontward of the rear suspension 20. The space that is frontward of the rear suspension 20 is effectively used to install another vehicle component.

In this preferred embodiment, as shown in FIG. 3, the through-hole 75 is provided in a portion that is longest in the vehicle width direction in the right inclining portion 74 of the right arm portion 72. Therefore, even when the through-hole 75 is provided in the right arm portion 72, the rigidity of the right arm portion 72 is kept sufficiently high.

In this preferred embodiment, as shown in FIG. 5, the right arm portion 72 is configured such that the size H1 thereof in the vehicle up-down direction increases as the right arm portion 72 is closer to the rear portion thereof and farther from the front portion thereof and then size H1 in the vehicle up-down direction is decreased. The right arm portion 72 includes the second portion 78B frontward of the first portion 78A in which the through-hole 75 is provided. The size L2 in the vehicle up-down direction of second portion 78B is smaller than the size L1 in the vehicle up-down direction of the first portion 78A. The right arm portion 72 also includes the third portion 78C rearward of the first portion 78A. The size L3 in the vehicle up-down direction of the third portion 78C is smaller than the size L1. As can be seen, the through-hole 75A is provided in a portion, in the right arm portion 72, which has a large size in the vehicle up-down direction. Therefore, the rigidity of the right arm portion 72 is made sufficiently high with certainty.

In this preferred embodiment, as shown in FIG. 5, as seen in a vehicle side view, a center O1 of the through-hole 75 is located below center position Z in the vehicle up-down direction of the right arm portion 72. As seen in a vehicle side view, the through-hole 75 overlaps the bolt insertion holes 87A and 88A of the coupling portion 86. Therefore, the bolt insertion holes 87A and 88A of the coupling portion 86 are located at a lower position. This allows the bottom end portion 22 of the rear suspension 20 to be located at a lower position. As a result, the position of the seat 3 is farther lowered.

In this preferred embodiment, as shown in FIG. 8, the left projection portion 90 and the right projection portion 91 of the coupling portion 86 extend toward the second cross member 84 and are connected to the top wall 84A of the second cross member 84. As compared with the case where only the left wall 87, the right wall 88 and the bottom wall 89 of the coupling portion 86 are connected to the second cross member 84, the coupling portion 86 and the second cross member 84 are secured to each other more strongly. As a result, the rigidity at which the rear suspension 20 coupled to the coupling portion 86 is supported is sufficiently high with certainty. By inserting a tool such as a driver or the like into the through-hole 75 from a position to the side of the through-hole 75, the bottom end portion 22 of the rear suspension 20 is attached to the coupling portion 86 easily by use of the bolt 92.

In this preferred embodiment, as shown in FIG. 5, the bottom edge 72 of the right arm portion 72 is located above the bottom edge 62B of the left arm portion 62. As shown in FIG. 2, at least a portion of the first silencer 43A is located below the right arm portion 72. Therefore, as compared with the case where the level of the bottom edge 72B of the right arm portion 72 from the ground and the level of the bottom edge 62B of the left arm portion 62 from the ground are equivalent to each other, the first silencer 43A is located at a higher position. As a result, a sufficient bank angle is provided with certainty. As shown in FIG. 5, the top edge 62A of the left arm portion 62 is located below the top edge 72A of the right arm portion 72. Therefore, as compared with the case where the level of the top edge 62A of the left arm portion 72 from the ground and the level of the top edge 72A of the right arm portion 72 from the ground are equivalent to each other, the size of the left arm portion 62 in the vehicle up-down direction is decreased. In this preferred embodiment, the size of the left arm portion 62 in the vehicle up-down direction and the size of the right arm portion 72 in the vehicle up-down direction are equal or substantially equal to each other. Therefore, the weight of the left arm portion 62 is prevented from increasing, and thus the weight of the rear arm 60 is prevented from increasing.

In this preferred embodiment, as shown in FIG. 7, the pipe 38 extends through the through-hole 75 in the vehicle width direction. This increases the rigidity of the right arm portion 72 in which the through-hole 75 is provided.

In this preferred embodiment, as shown in FIG. 9, the second cross member 84 is inclined with respect to the horizontal direction and is lowered as being closer to the left arm portion 62 and farther from the right arm portion 72. Therefore, as compared with the case where the second cross member 84 extends in the horizontal direction, the length of the second cross member 84 in the vehicle width direction is increased. As a result, a portion of the second cross member 84 to which the coupling portion 86 is to be attached is provided easily with certainty. Since the position of the coupling portion 86 is selected relatively freely, the position of the through-hole 75 is also selected relatively freely. The level of freedom at which the coupling portion 86 and the through-hole 75 are located in the vehicle up-down direction and the vehicle width direction is increased.

In this preferred embodiment, as shown in FIG. 2, as seen in a vehicle side view, the rear arm 60 and a portion of the first silencer 43A overlap each other. Since a portion of the first silencer 43A is located at a higher position, the first silencer 43A has a sufficient capacity with certainty while the position of the seat 3 is lowered.

In this preferred embodiment, as shown in FIG. 8, the coupling portion 86 is provided on the rear wall 84C of the second cross member 84. Unlike in the case where the coupling portion 86 is provided on the front wall 84B of the second cross member 84, a space is provided frontward of the rear suspension 20. This space is effectively used to, for example, install vehicle components. For example, the capacity of the air cleaner 52 located frontward of the rear suspension 20 is increased. Since the coupling portion 86 is located on the rear wall 84C, the size of the second cross member 84 in the vehicle up-down direction does need to be decreased in order to lower the position of the bottom end portion 22 of the rear suspension 20. As a result, the position of the bottom end portion 22 of the rear suspension 20 is lowered while the rigidity of the second cross member 84 is kept high with certainty.

Preferred Embodiment 2

Figure 11:
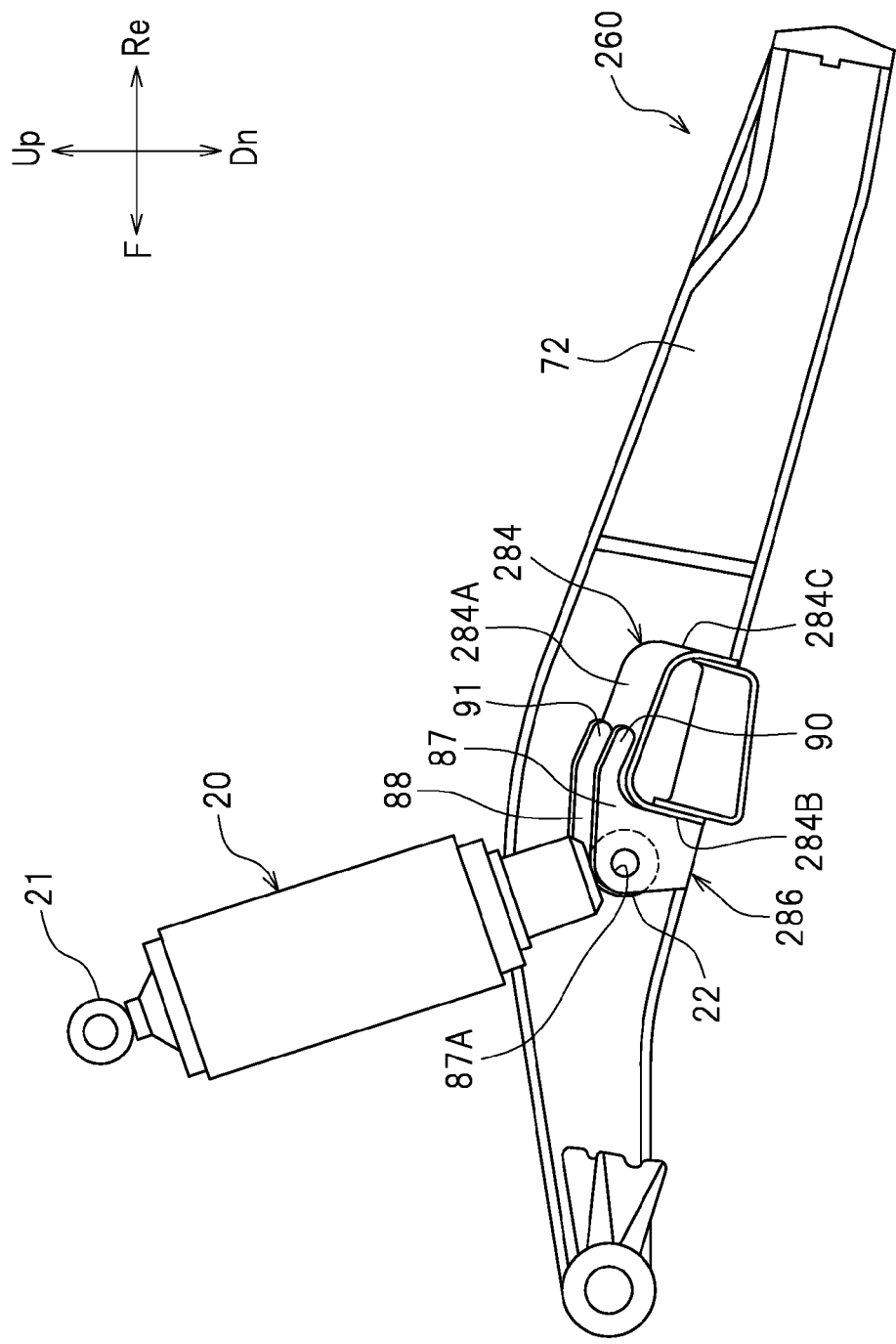
FIG. 11 is a cross-sectional view showing a portion of a structure of a rear arm according to a preferred embodiment of the present invention.

In Preferred Embodiment 1, the coupling portion 86 is preferably provided on the rear wall 84C of the second cross member 84. There is no specific limitation on the position of the coupling portion 86. FIG. 11 is a side view showing a portion of a structure of the rear arm 60 in Preferred Embodiment 2. As shown in FIG. 11, a second cross member 284 includes a top wall 284A, a front wall 284B and a rear wall 284C. The second cross member 284 includes a coupling portion 286 to which the bottom end portion 22 of the rear suspension 20 is coupled. The coupling portion 286 is provided on the front wall 284B of the second cross member 284. The rear suspension 20 is located frontward of the second cross member 284. The rear suspension 20 is configured such that the size thereof in the vehicle up-down direction is larger than the size thereof in the vehicle front-rear direction. The structure preferably is the same as that in preferred embodiment 1 other than this point, and will not be described again.

In this preferred embodiment, the coupling portion 286 is provided on the front wall 284B of the second cross member 284. As a result, a space is provided with certainty rearward of the rear suspension 20, and thus the distance between the rear suspension 20 and the rear wheel 14 is capable of being shortened. As a result, the motorcycle 1 is kept compact in the vehicle front-rear direction with certainty. Since the coupling portion 286 is provided on the front wall 284B, the size of the second cross member 284 in the vehicle up-down direction does not need to be decreased in order to lower the position of the bottom end portion 22 of the rear suspension 20. Therefore, the position of the bottom end portion 22 of the rear suspension 20 is lowered while the rigidity of the second cross member 284 is kept high with certainty.

As seen in a vehicle side view, the bolt insertion holes of the coupling portion may overlap the through-hole 75 of the right arm portion 72, and the coupling portion may be provided on the top wall 284A of the second cross member 284.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle vehicle, comprising:
a vehicle body frame;
an engine supported by the vehicle body frame;
a rear arm at least partially located rearward of the engine;
an exhaust pipe coupled to the engine;
a seat supported by the vehicle body frame;
a rear suspension located below the seat;
a silencer coupled to the exhaust pipe and at least partially located below the seat and the rear suspension; and
a rear wheel supported by a rear end portion of the rear arm and located rearward of the rear suspension; wherein
the rear suspension is configured such that a size thereof in a vehicle up-down direction is larger than a size thereof in a vehicle front-rear direction;
the rear arm includes a left arm portion located to the left of the rear wheel, a right arm portion located to the right of the rear wheel, and a cross member coupled to the left arm portion and the right arm portion;
at least one of the left arm portion and the right arm portion is provided with a through-hole extending therethrough in a vehicle width direction, the through-hole being provided between a top edge and a bottom edge of the at least one of the left arm portion and the right arm portion provided with the through-hole;
the cross member includes a coupling portion to which a bottom end portion of the rear suspension is coupled; and
as seen in a vehicle side view, at least a portion of the coupling portion overlaps the through-hole.

2. The straddle vehicle according to claim 1, further comprising an air cleaner located rearward of the engine, wherein the rear suspension is located rearward of the air cleaner.

3. The straddle vehicle according to claim 2, further comprising a hydraulic unit of an anti-lock brake device; wherein:
the hydraulic unit is located below the air cleaner;
the rear suspension is located rearward of the hydraulic unit; and
the rear arm is located below the hydraulic unit.

4. The straddle vehicle according to claim 1, wherein:
the left arm portion includes a left inclining portion inclined obliquely in a rearward and leftward direction;
the right arm portion includes a right inclining portion inclined obliquely in a rearward and rightward direction;
as seen in a plan view, the coupling portion is located between the left inclining portion and the right inclining portion; and
the through-hole is provided in a portion, that is longest in the vehicle width direction, in the left inclining portion and the right inclining portion.

5. The straddle vehicle according to claim 1, wherein:
the at least one of the left arm portion and the right arm portion provided with the through-hole includes a second portion that is located frontward of a first portion provided with the through-hole and has a size in the vehicle up-down direction smaller than a size in the vehicle up-down direction of the first portion, and a third portion that is located rearward of the first portion and has a size in the vehicle up-down direction smaller than the size in the vehicle up-down direction of the first portion.

6. The straddle vehicle according to claim 1, wherein as seen in a vehicle side view, a center of the through-hole is located below a center position in the vehicle up-down direction of the at least one of the left arm portion and the right arm portion provided with the through-hole.

7. The straddle vehicle according to claim 1, wherein:
the coupling portion includes a left wall extending in the vehicle up-down direction, a right wall located to the right of the left wall and extending in the vehicle up-down direction, a bottom wall extending between a bottom end of the left wall and a bottom end of the right wall, a left projection portion extending from a top end of the left wall toward the cross member and connected to a top wall of the cross member, and a right projection portion located to the right of the left projection portion, extending from a top end of the right wall toward the cross member and connected to the top wall of the cross member;
the left wall and the right wall are respectively provided with holes; and
as seen in a vehicle side view, the holes overlap the through-hole.

8. The straddle vehicle according to claim 1, wherein:
the through-hole is provided in the left arm portion or the right arm portion;
as seen in a vehicle side view, in the right arm portion or the left arm portion provided with the through-hole, the bottom edge of the portion in which the through-hole is provided is located above a bottom edge of a portion, of the other arm portion, that faces the through-hole; and
at least a portion of the silencer is located below the through-hole.

9. The straddle vehicle according to claim 1, wherein a pipe extends through the through-hole in the vehicle width direction.

10. The straddle vehicle according to claim 1, wherein the cross member is inclined with respect to a horizontal direction.

11. The straddle vehicle according to claim 1, wherein as seen in a vehicle side view, the rear arm and a portion of the silencer overlap each other.

12. The straddle vehicle according to claim 1, wherein:
the cross member includes a front wall extending from the left arm portion to the right arm portion, and a rear wall located rearward of the front wall and extending from the left arm portion to the right arm portion; and
the coupling portion is provided on the rear wall.

13. The straddle vehicle according to claim 1, wherein:
the cross member includes a front wall extending from the left arm portion to the right arm portion, and a rear wall located rearward of the front wall and extending from the left arm portion to the right arm portion; and
the coupling portion is provided on the front wall.

* * * * *